Figures 1, 2:
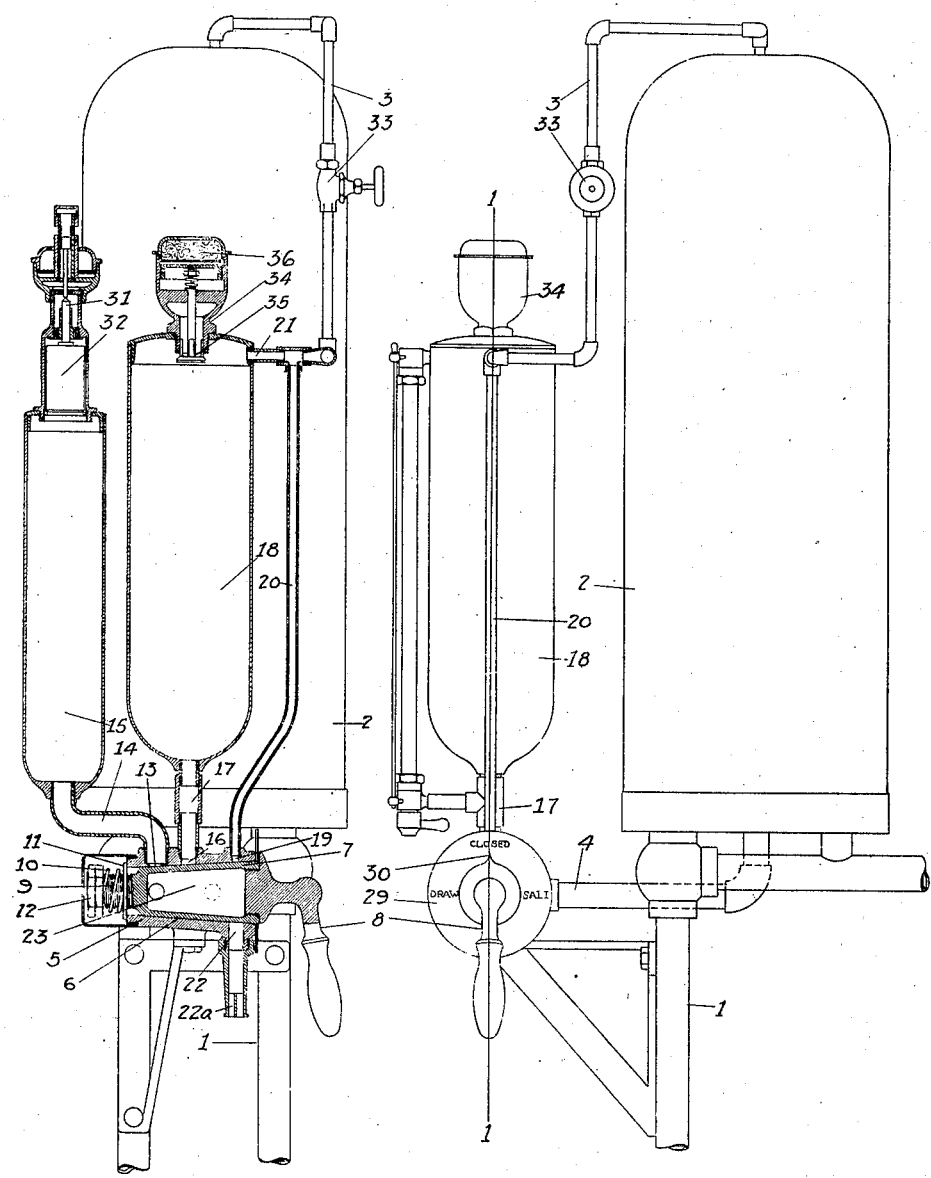

March 22, 1927.

G. H. WOODS ET AL 1,621,861

DISPENSING DEVICE

Filed March 31, 1923   2 Sheets-Sheet 1

Inventors
Grover H. Woods
Adam B. Denison
William A. Wiley
by I.T. Lund
Attorney

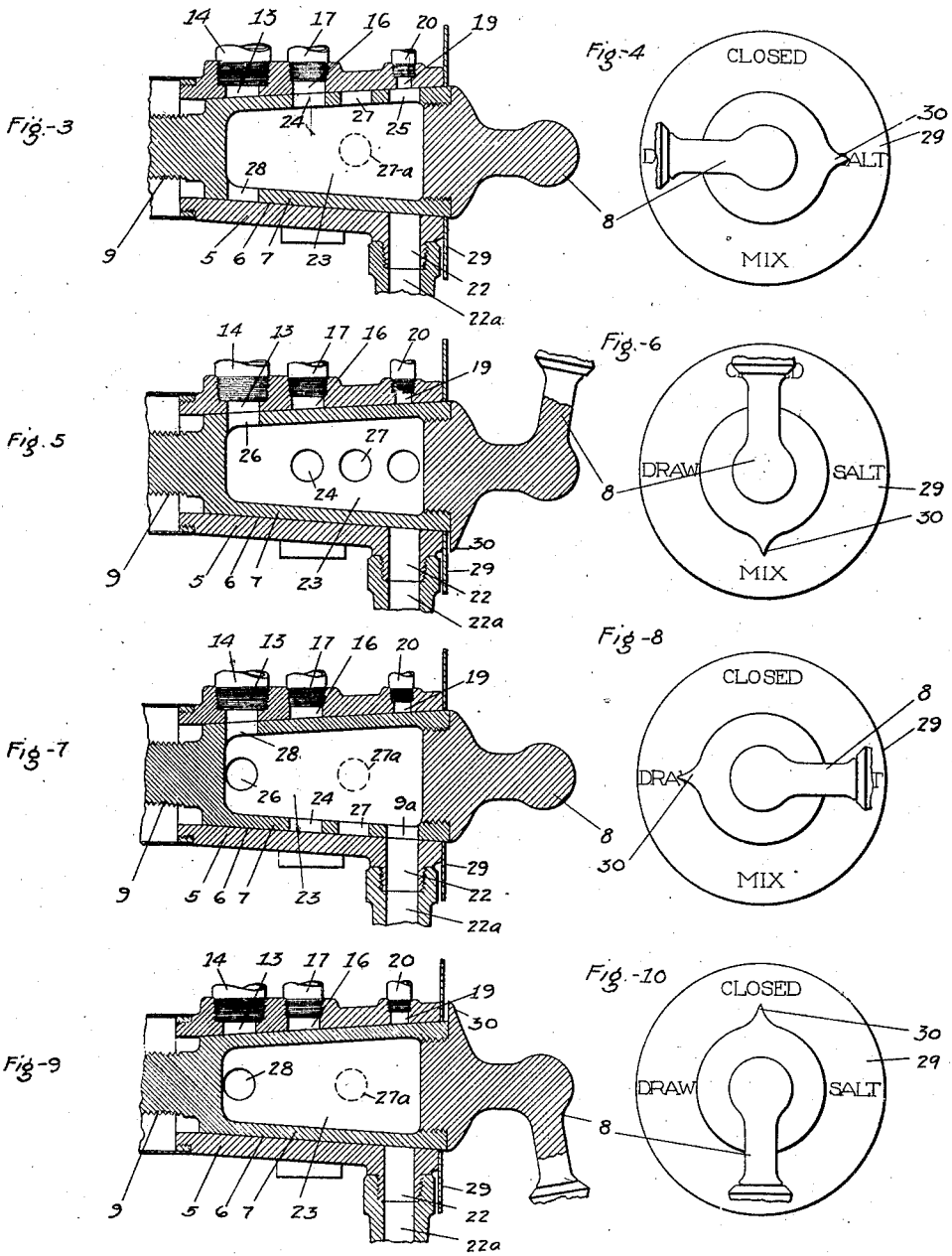

Patented Mar. 22, 1927.

1,621,861

UNITED STATES PATENT OFFICE.

GROVER H. WOODS AND ADAM B. DENISON, OF CLEVELAND, OHIO, AND WILLIAM A. WILEY, OF ERIE, PENNSYLVANIA, ASSIGNORS TO AMERICAN STERILIZER COMPANY, OF ERIE, PENNSYLVANIA, A CORPORATION OF PENNSYLVANIA.

DISPENSING DEVICE.

Application filed March 31, 1923. Serial No. 628,967.

This invention is particularly designed to supply saline solutions for hospital use. In the use of such a solution it is desirable to have a solution of pre-determined strength which may be readily stored in concentrate form, diluted in measured quantities with the pre-determined strength and delivered conveniently for use in an assured sterile condition. Features and details of the invention will appear from the specification and claims.

The invention is illustrated in the accompanying drawings as follows:—

Fig. 1 shows a section on the line 1—1 in Fig. 2.

Fig. 2 a side elevation of the apparatus.

Fig. 3 a central section through the measuring valve set to receive concentrated saline solution.

Fig. 4 a valve dial indicating the location of the valve.

Fig. 5 a section similar to Fig. 3 but with the valve turned to connect the diluted liquid and the mixing chamber through the valve.

Fig. 6 a dial indicating the position of the valve in Fig. 5.

Fig. 7 a central section of the measuring valve with the valve ports turned to a position to discharge fluid from the measuring tank.

Fig. 8 a dial showing the position of the valve in Fig. 7.

Fig. 9 a central section of the valve in closed position.

Fig. 10 a dial indicating this position of the valve.

1 marks the stand on which the apparatus is mounted, 2 a storage tank, this being of ordinary form for storing and maintaining sterile distilled water, 3 a steam pipe connection leading to the storage tank and to the dispensing apparatus by which it may be sterilized, and 4 a connection leading from the storage tank to the body 5 of the measuring valve.

The measuring valve has a tapered valve opening 6 through it in which a measuring valve 7 is mounted, the measuring valve being in the form of an ordinary plug valve except that it has a measuring chamber. It is provided with a handle 8 at one end, a screw-threaded extension 9 at the opposite end, and a spring 10 arranged around the extension 9 and between a washer 11 and nuts 12, the spring being designed to maintain the measuring valve on its seat.

The measuring valve body has a port 13 which is connected by a pipe 14 with a mixing chamber 15. It is also provided with a port 16 connected by a pipe 17 with a concentrate containing receptacle 18. The body also has a port 19 which is connected by a pipe 20 with the pipe 3, the pipe 20 being also connected through a pipe 21 with the upper end of the receptacle 18. The body also has a discharge port 22 which leads to a discharge nozzle 22ª. The valve 7 has a measuring chamber 23 which holds a predetermined amount of concentrate. A way 24 leads from this chamber and is adapted to be brought into register with the port 16. It also has a way 25 which is adapted to be brought into register with the port 19 at the same time the port 24 is in register with the port 16. When it is desired to fill the measuring chamber of the measuring valve with concentrated solution the valve is moved to the position shown in Fig. 3 and concentrated solution passes by way of the pipe 17, port 16, way 24 to the mixing chamber. Any air in the measuring chamber is allowed to escape by way of the way 25, port 19, and the pipe 20 so that the filling of the measuring chamber is assured. This position of the valve is indicated on the dial 29, the pointer 30 being brought to the place marked "Salt".

The valve is then turned to the position shown in Fig. 5. A way 26 is arranged in the valve plug and this is adapted to be brought into register with the port 13. It is also provided with a way 27 which is adapted to be brought into register with a port 27ª (see dotted lines) to which the pipe 4 is connected. Diluting liquid, therefore, passes immediately from the storage tank 2, crowding the concentrate solution before it and clearing the entire solution from the chamber 23 and filling the mixing chamber 15. The mixing chamber is provided with a valve 31 at its upper end which is controlled by a float 32 so that when the mixing chamber has been filled from the storage tank with the diluting liquid and the measured concentrate it is closed.

The valve is then moved to the position shown in Fig. 7. The valve has a way 28 which is adapted to be brought into register with the port 13 at the same time that the way 9ª in the valve is brought into register with the discharge port 22 and the measured diluted saline solution then drains from the mixing chamber past the measuring valve through the discharge nozzle to the receptacle from which it is used. The valve is then closed by turning it to the position shown in Fig. 9 where all the ports and ways are out of register. The dial 29 acting in connection with the pointer 30 gives the position of the valve in each instance, that is to say, with the position shown in Fig. 5 the dial indicates that the valve is in mixing position. With the position shown in Fig. 7 the dial indicates that the valve is in position to draw, and with the parts in the position shown in Fig. 9 the dial indicates that the valve is closed.

By opening the valve 33 in the steam pipe 3 steam may be blown through the measuring valve, pipe 20, 21, receptacle 18 and mixing chamber, and in fact all the connections so that they may be thoroughly sterilized. The concentrate solution is put into the receptacle 18 by removing the cap 34. This cap is provided with a check valve 35 which assures the sterilizing pressure on the chamber. This cap has a sterilizing gauze 36 which admits sterilized air as the concentrate is withdrawn.

What we claim as new is:—

1. In a dispensing device, the combination of a concentrate liquid receptacle; a dilute liquid tank; a mixing chamber; a measuring device having a measuring space therein; connections between the dilute liquid tank and the measuring device, between the measuring device and the mixing chamber, and between the tank and the measuring device; and valve mechanism controlling said connections to throw the receptacle and measuring device into communication and to close such connection and open connection between the measuring device, mixing chamber and tank.

2. In a dispensing device, the combination of a concentrate liquid receptacle; a dilute liquid tank; a mixing chamber; a measuring device having a measuring space therein; connections between the dilute liquid tank and the measuring device, between the measuring device and the mixing chamber, and between the tank and the measuring device; and valve mechanism controlling said connections to throw the receptacle and measuring device into communication and to close such connection and open connection between the measuring device, mixing chamber and tank and close the connection between the mixing chamber and measuring device.

3. In a dispensing device, the combination of a concentrate liquid receptacle; a dilute liquid tank; a mixing chamber; a measuring device having a measuring space therein; connections between the dilute liquid tank and the measuring device, between the measuring device and the mixing chamber, and between the tank and the measuring device; and valve mechanism controlling said connections to throw the receptacle and measuring device into communication and to close such connection and open connection between the measuring device, mixing chamber and tank and close the connection between the mixing chamber and measuring device and the connection between the receptacle and the measuring device.

4. In a dispensing device, the combination of a concentrate liquid receptacle; a dilute liquid tank; a mixing chamber; a measuring device having a measuring space therein and a discharge passage; connections between the dilute liquid tank and the measuring device, between the measuring device and the mixing chamber, between the tank and the measuring device and between the mixing chamber and the discharge passage; and valve mechanism controlling said connections to open the connection between the concentrate chamber and the measuring device, to close said connection, open a connection between the measuring device and the mixing chamber and between the receptacle and the measuring device to close the connection between the measuring device and the tank and open the connection between the mixing chamber and the discharge passage.

5. In a dispensing device, a concentrate liquid receptacle, a dilute liquid tank, a mixing chamber, and a measuring valve comprising a casing with ports connected with said receptacle, tank, and chamber, and a discharge port, a plug in said casing having a measuring chamber, said plug having ports corresponding to the ports in the casing, said plug adapted to be positioned to receive a charge from said receptacle, to connect said tank and chamber through said measuring valve, and to close the connection between the tank and measuring valve.

6. In a dispensing device, a concentrate liquid receptacle, a dilute liquid tank, a mixing chamber, and a measuring valve comprising a casing with ports connected with said receptacle, tank, and chamber, and a discharge port, a plug in said casing having a measuring chamber, said plug having ports corresponding to the ports in the casing, said plug adapted to be positioned to receive a charge from said receptacle, to connect said tank and chamber through said measuring valve, to withdraw the contents from said mixing chamber through said discharge port, and to close all of said ports.

7. In a dispensing device, a concentrate liquid receptacle, a dilute liquid tank, a mixing chamber, and a measuring valve comprising a casing with ports connected with said receptacle, tank, and chamber, and a discharge port, a plug in said casing having a measuring chamber, said plug having ports corresponding to the ports in the casing, said plug adapted to be positioned to receive a charge from said receptacle, to connect said tank and chamber through said measuring valve, and to close the connection between the tank and measuring valve, said measuring valve having a vent port leading to the measuring chamber when the measuring chamber is connected with the receptacle.

8. In a dispensing device, the combination of a concentrate liquid receptacle; a dilute liquid tank; a mixing chamber; a measuring device having a measuring space therein; connections between the dilute liquid tank and the measuring device, between the measuring device and the mixing chamber, and between the tank and the measuring device; valve mechanism controlling said connections to throw the receptacle and measuring device into communication and to close such connection and open connection between the measuring device, mixing chamber and tank; and means for connecting said measuring device, mixing chamber and receptacle with a sterilizing steam supply.

9. In a dispensing device, the combination of a concentrate liquid receptacle; a dilute liquid tank; a mixing chamber; a measuring device having a measuring space therein; connections between the dilute liquid tank and the measuring device, between the measuring device and the mixing chamber, and between the tank and the measuring device; a float-controlled closure valve in the mixing chamber; and valve mechanism controlling said connections to throw the receptacle and measuring device into communication and to close such connection and open connection between the measuring device, mixing chamber and tank.

10. In a dispensing device, the combination of a concentrate liquid receptacle; a dilute liquid tank; a mixing chamber; a measuring device having a measuring space therein; connections between the dilute liquid tank and the measuring device, between the measuring device and the mixing chamber, and between the tank and the measuring device; valve mechanism controlling said connections to throw the receptacle and measuring device into communication and to close such connection and open connection between the measuring device, mixing chamber and tank; and a dial showing the various positions of the mechanism.

11. In a dispensing device, the combination of a concentrate liquid receptacle; a dilute liquid tank; a mixing chamber of predetermined volume; a measuring device having a measuring space therein; connections between the dilute liquid tank and the measuring device, between the measuring device and the mixing chamber, and between the tank and the measuring device; and valve mechanism controlling said connections to throw the receptacle and measuring device into communication and to close such connection and open the connection between the measuring device, mixing chamber and tank whereby the measuring device measures the concentrate and the mixing chamber the concentrate and diluting liquid.

In testimony whereof we have hereunto set our hands.

GROVER H. WOODS.
ADAM B. DENISON.
WILLIAM A. WILEY.